March 11, 1941.  P. L. RIES ET AL  2,234,357
TRIPOD
Filed May 8, 1939
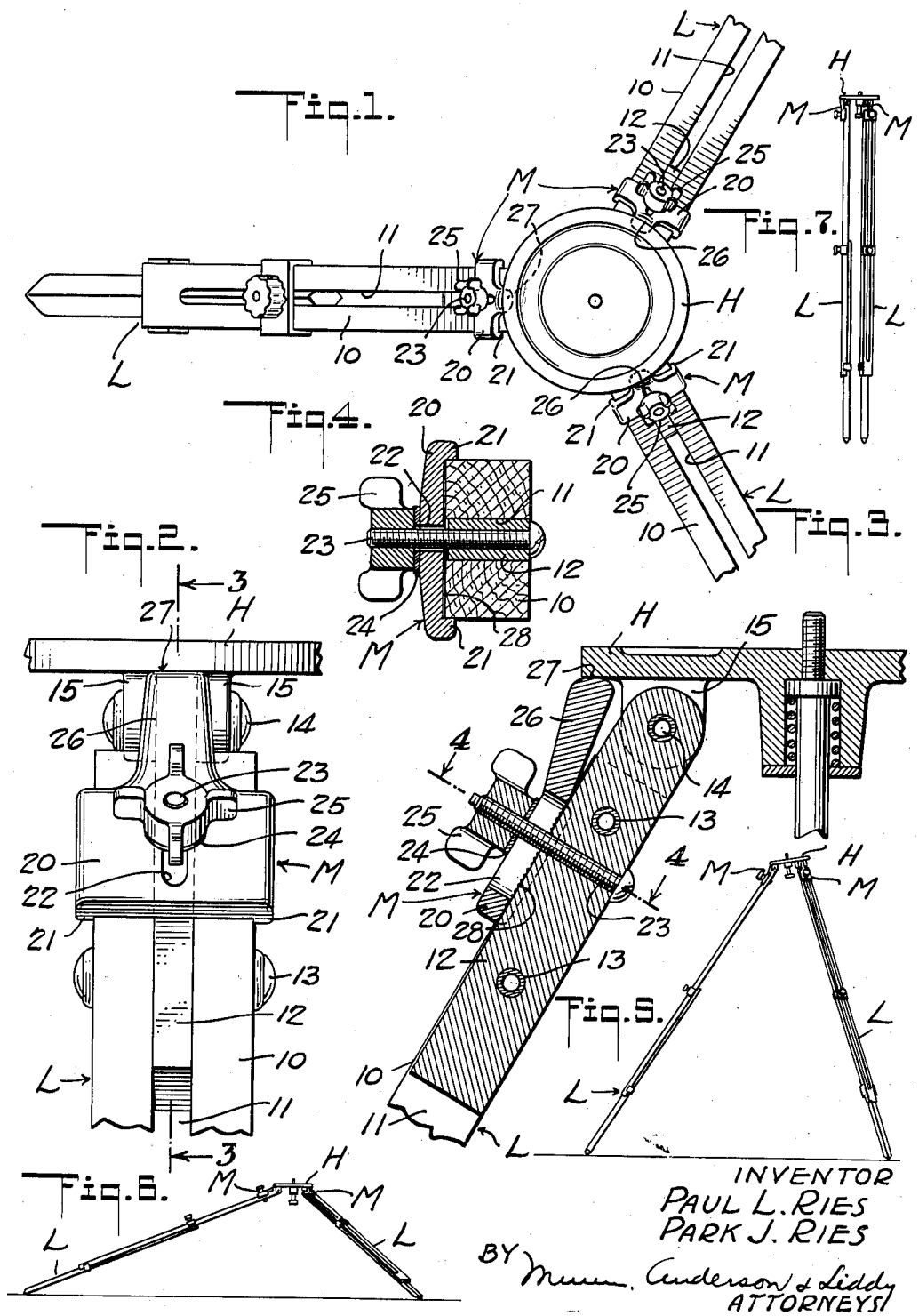
INVENTOR
PAUL L. RIES
PARK J. RIES
BY Anderson & Liddy
ATTORNEYS Patented Mar. 11, 1941

2,234,357

UNITED STATES PATENT OFFICE 2,234,357

TRIPOD

Paul L. Ries and Park J. Ries, Los Angeles, Calif.

Application May 8, 1939, Serial No. 272,337

3 Claims. (Cl. 248—192)

This invention relates to portable supports, such as tripods, for adjustably supporting photographic apparatus, surveying instruments and other equipment.

An object of the invention is to provide a tripod structurally characterized by simple and highly efficient means for maintaining the tripod legs against spreading beyond any selected supporting position of adjustment, whereby to prevent collapse of the tripod should its legs be struck or be resting on a surface providing insufficient friction to insure the tripod against displacement, all to the end of protecting the apparatus on the tripod against damage attending collapse of the latter.

Another object of the invention is to provide a tripod the legs of which can be sustained against collapse in widely spread positions beyond any spread position in which the legs would be self-supporting, thus enabling the head of the tripod to be disposed at a relatively low height above the surface on which the legs rest, while affording maximum stability of the tripod to adequately protect the apparatus thereon against damage resulting from collapse of the legs.

A further object of the invention is to provide a tripod which can be maintained against spreading of its legs beyond any selected position of adjustment, in various tilted positions of the tripod head wherein the legs would otherwise be incapable of self-support, and which can also be maintained without any extraneous holding means, with the tripod legs fully closed to permit any leg to be utilized as a handle for carrying the tripod.

A still further object of the invention is to provide a tripod in which the leg sustaining means can be in the nature of an attachment applicable to tripods on the market without any structural modification thereof, and which can be embodied in tripods during manufacture thereof at a comparatively small cost.

With these and other objects in view, the invention resides in the elements and combinations, arrangements and functional relationships thereof as set forth in the following specification and particularly pointed out in the appended claims.

In the accompanying drawing—

Figure 1 is a view showing in plan a tripod embodying this invention;

Figure 2 is an enlarged fragmentary view in side elevation, of a portion of the tripod head and the upper portion of a leg;

Figure 3 is a vertical sectional view taken on the line 3—3 of Figure 2;

Figure 4 is a vertical sectional view taken on the line 4—4 of Figure 3;

Figures 5, 6 and 7 are diagrammatic views of the tripod illustrating different positions of adjustment of the tripod legs.

Referring specifically to the drawing, the invention in its illustrated embodiment comprises a plurality of stop members M, preferably one for each of the tripod legs L which can be adjustable in length in any suitable manner. Each tripod leg is illustrated as including an upper section 10 of wood longitudinally slotted from its upper end as indicated at 11 to receive a metal connector 12 secured to the section 10 by bolts 13 and projecting beyond the section for pivotal connection by a bolt 14 to spaced ears 15 depending from the head H of the tripod, all to the end of pivotally connecting the legs to the head for movement in radial paths from a fully closed position to various open positions, as is well known in the art.

The stop members M are of identical construction and each comprises a flat rectangular body 20 having laterally projecting side flanges 21 sufficiently spaced to receive the width of the upper leg section 10 therebetween to guide the member rectilinearly on the leg section. The body 20 is provided with a slot 22 receiving a screw 23 threaded tightly through the connector 12 of the respective leg section and having a washer 24 and a hand nut 25.

The stop member is thus slidably mounted on the tripod leg for adjustment and clamping in any selected position. Projecting from the body 20 is an arm 26, the free end portion of which constitutes an abutment 27 adapted to engage the underside of the tripod head adjacent its periphery for co-action with the head in definitely limiting opening movement of the leg in various spread positions, or in preventing opening movement of the leg from closed position, depending on the adjusted position along the length of the leg, in which the stop member is clamped to the leg by the nut 25.

In order to avoid any possibility of the stop member shifting or slipping on the leg L, when the stop member is frictionally clamped thereto, the inner face of the body 20 is roughened by transverse serrations or teeth 28 or other suitable means which will tend to penetrate or more firmly grip the leg at opposite sides of the connector 12.

It will be noted that Figure 1 illustrates a position of equal adjustment of the stop members M to dispose the head H level and with the legs L sufficiently spread to safely support an apparatus on the tripod against collapsing of the legs when struck or when resting on a surface providing insufficient friction to prevent slipping of the legs.

Figure 5 illustrates the tripod head in a tilted position for "angle shots" in photography; Figure 6 illustrates an extremely low level position of the tripod head made possible by the stop members M and enabling the legs to be maintained in widely spread relationship for maximum stability; and Figure 7 illustrates the legs L fully closed and maintained in such position against opening movement, by the stop members M, to enable any one of the legs to be grasped and utilized as a handle in carrying the tripod.

From the foregoing description, it will be manifest that by the provision of this invention the danger of the tripod collapsing as a result of spreading of its legs beyond a selected position of adjustment can be eliminated, so that the apparatus supported on the tripod will be protected against such damage as might result from collapsing of the tripod.

What is claimed is:

1. A stop device for tripod legs comprising a body having an abutment and spaced flanges adapted to co-act with a tripod leg in slidably mounting the body thereon for co-action of said abutment with the tripod head in definitely limiting opening movement of the tripod leg at various positions; and means adapted to secure said body to a tripod leg in any selected position of adjustment.

2. A stop device for tripod legs comprising a slotted body having an abutment and spaced flanges adapted to co-act with a tripod leg in slidably mounting the body thereon for co-action of said abutment with the tripod head in definitely limiting opening movement of the tripod leg at various positions; a screw adapted to extend from the tripod leg through said slot of the body; and a nut on the screw adapted to clamp the body to the tripod leg in any selected position of adjustment.

3. A stop device for tripod legs comprising a slotted body having an abutment and spaced flanges adapted to co-act with a tripod leg in slidably mounting the body thereon for co-action of said abutment with the tripod head in definitely limiting opening movement of the tripod leg at various positions; a screw adapted to extend from the tripod leg through said slot of the body; a nut on the screw adapted to clamp the body to the tripod leg in any selected position of adjustment; and means on the body defining teeth adapted to penetrate the tripod leg to positively prevent displacement of the stop member on the leg.

PAUL L. RIES.
PARK J. RIES.